United States Patent [19]

Webb et al.

[11] Patent Number: 5,056,833
[45] Date of Patent: Oct. 15, 1991

[54] FLEXIBLE PIPE COUPLING

[75] Inventors: Ian R. Webb, Kenton; William Taylor, Pinner; Neil J. T. Taylor, Rickmansworth, all of United Kingdom

[73] Assignee: Taylor Kerr (Couplings) Limited, London, United Kingdom

[21] Appl. No.: 401,438
[22] PCT Filed: Mar. 25, 1988
[86] PCT No.: PCT/GB88/00230
  § 371 Date: Sep. 11, 1989
  § 102(e) Date: Sep. 11, 1989
[87] PCT Pub. No.: WO88/07644
  PCT Pub. Date: Oct. 6, 1988

[30] Foreign Application Priority Data

Mar. 25, 1987 [GB] United Kingdom ............... 8707057

[51] Int. Cl.$^5$ ............................................. F16L 17/00
[52] U.S. Cl. ................................... 285/112; 265/177; 265/373
[58] Field of Search ................... 285/177, 112, 373

[56] References Cited

U.S. PATENT DOCUMENTS

| 1,683,076 | 9/1928 | Johnson et al. |
|---|---|---|
| 2,632,450 | 3/1953 | Allen ............................ 285/177 X |
| 3,680,894 | 8/1972 | Young . |
| 3,877,733 | 4/1975 | Straub . |
| 3,977,705 | 8/1976 | Thiessen ........................... 285/112 |
| 4,186,948 | 2/1980 | Cronk ............................... 285/177 |
| 4,480,860 | 11/1984 | Foresta et al. . |
| 4,583,770 | 4/1986 | Kreku et al. ....................... 285/177 |
| 4,671,541 | 6/1987 | Webb et al. ...................... 285/177 X |

FOREIGN PATENT DOCUMENTS

| 0079457 | 5/1983 | European Pat. Off. . |
|---|---|---|
| 913114 | 8/1946 | France . |
| 2436929 | 4/1980 | France . |
| 1010664 | 11/1965 | United Kingdom . |

Primary Examiner—Dave W. Arola
Attorney, Agent, or Firm—Flynn, Thiel, Boutell & Tanis

[57] ABSTRACT

A resiliently flexible pipe coupling for interconnecting two pipe ends in a pressure-tight manner includes a tubular sealing sleeve of resilient flexible material, and an adjustable tubular metal casing for clamping the sealing sleeve around the pipe ends. The sealing sleeve includes a tubular web portion and sealing lips integral with the web portion. The sealing lips are formed in adjoining relationship relative to the web portion and define free ends of the sealing sleeve. The sealing lips extend radially inwardly from the web portion and are spaced apart longitudinally. Each sealing lip includes a radially inner pipe-engaging surface for engaging one of the pipe ends, and the pipe-engaging surface of one of the lips has a substantially different internal diameter from the pipe-engaging surface of the other lip, whereby the coupling is adapted to connect two pipe ends of different external diameter. The web portion is radially thicker in the region of the lip of smaller internal diameter than in the region of the lip of greater internal diameter. This permits the axially inwardly facing surfaces of the respective lips to have substantially the same surface area.

12 Claims, 2 Drawing Sheets

FLEXIBLE PIPE COUPLING

The present invention relates to a resiliently flexible pipe connection, and, in particular, to a flexible pipe coupling for interconnecting two pipes in a pressure-tight manner of the type consisting of a tubular metal casing formed with a longitudinal gap, a tensioning screw device secured thereto for reducing the width of the longitudinal gap, and a sealing sleeve of resiliently flexible material arranged within the casing and having formed on both free ends thereof sealing lips of predetermined thickness extending radially inwardly with respect to the sleeve.

Such mechanical pipe connections of the flexible couplings type are provided for connecting together smooth-ended pipes of any material. Moreover, the couplings can be adjusted in the factory so that they fit over pipes even when the pipes are of the maximum size permitted within their tolerance range. The metal casing is tightened in the circumferential direction of the pipes by means of the screw device. A reliable sealing effect is ensured by the sleeve with its sealing lips. The sleeve adapts itself to changing pressures within the pipe. To a certain extent also differences in the outside diameters of the pipes to be interconnected can be compensated for by the known pipe couplings. Thus, for example, in the case of pipes having a nominal diameter of 50 mm to 350 mm, differences of between 1.5 mm and 4 mm can be compensated for solely by the elasticity of the sealing lips together with the flexibility of the metal casing. In cases where there are larger differences in the outside diameters of the pipes, there is the disadvantage that such a compensation is no longer possible.

In the field of gas and water supply as well as in water discharge apparatus the joining together of existing old conduits with pipes of present day manufacture, which in some cases may be composed of different materials and have a greater or smaller diameter than the existing old pipe, using the resiliently flexible pipe connections described above is not possible in cases where this dimensional difference exceeds several mm. A requirement to join tubular conduits of different outside diameter may also arise where the wall thickness of the conduit parts are different due to the conduit parts being designed to operate to different nominal pressures or due to the conduit parts being made of different materials having different strengths and therefore requiring different wall thickness to withstand a given pressure.

In our patent specification GB 2180311 (and corresponding U.S. Pat. No. 4,671,541) we described a resilient flexible pipe coupling for interconnecting two pipes in a pressure-tight manner, comprising a tubular metal casing formed with a longitudinal gap and a tensioning screw device secured to the casing for reducing the width of the longitudinal gap. A sealing sleeve of resiliently flexible material is positioned within the casing and has sealing lips of predetermined thickness formed on both of its free ends. The sealing lips extending radially-inwardly with respect to the pipes and have different radial thicknesses relative to each other. Advantageously, the difference in radial thickness of the sealing lips is such that differences in the diameters of the pipes to be connected of up to 30 mm or even more can be compensated for. At the same time the flexible characteristics of the coupling are preserved which enable it to compensate for changes in the temperature of the pipes especially dissimilar rates of expansion and contraction caused by temperature change on two different pipe materials joined within the same coupling, and for angular deflections in the joints.

The present invention relates to improvements in the coupling described in our specification GB 2180311.

According to the present invention in a first aspect there is provided a resiliently flexible pipe coupling for interconnecting two pipes in a pressure-tight manner, comprising a tubular sealing sleeve of resilient flexible material and an adjustable tubular metal casing for clamping the sealing sleeve around the pipe ends, the sealing sleeve comprising a tubular web portion and sealing lips integral with the web portion formed on both free ends of the sealing sleeve and extending radially inwardly from the web portion, the sealing lips being spaced apart longitudinally and the radially inner pipe-engaging surface of one lip having a substantially different internal diameter to the radially inner pipe-engaging surface of the other lip whereby the coupling is adapted to connect two pipes of different external diameter, each of the sealing lips having an annular extension formed on its axially inner side which is separated from the web portion of the sealing sleeve by a groove, characterised in that the web portion in the region of the extension to the sealing lip of smaller internal dimension is thicker than the web portion in the region of the extension to the other sealing lip.

The internal diameter of the inner surface of the web portion made decrease gradually between the regions of the two lips. Alternatively there may be a stepped transition between the thicker and thinner portions of the web.

According to the present invention in a second aspect there is provided a resiliently flexible pipe coupling for interconnecting two pipes in a pressure-tight manner, comprising a tubular sealing sleeve of resilient flexible material and an adjustable tubular metal casing for clamping the sealing sleeve around the pipe ends, the sealing sleeve comprising a tubular web portion and sealing lips integral with the web portion formed on both free ends of the sealing sleeve and extending radially inwardly from the web portion, the sealing lips being spaced apart longitudinally and the radially inner pipe-engaging surface of one lip having a substantially different internal diameter to the radially inner pipe-engaging surface of the other lip whereby the coupling is adapted to connect two pipes of different external diameter, characterised in that the internal diameter of the web portion decreases from the end of the sleeve adjacent the lip of greater internal diameter towards the lip of smaller internal diameter so that the inner side faces of the lips are of substantially the same area.

Embodiments of the invention will now be described by way of example with reference to the accompanying drawings, of which:

Figure 1:
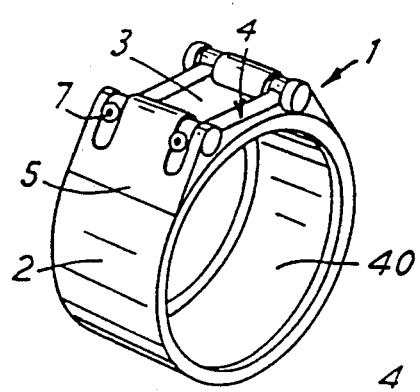
FIG. 1 shows a stepped coupling in perspective.
Figure 2:
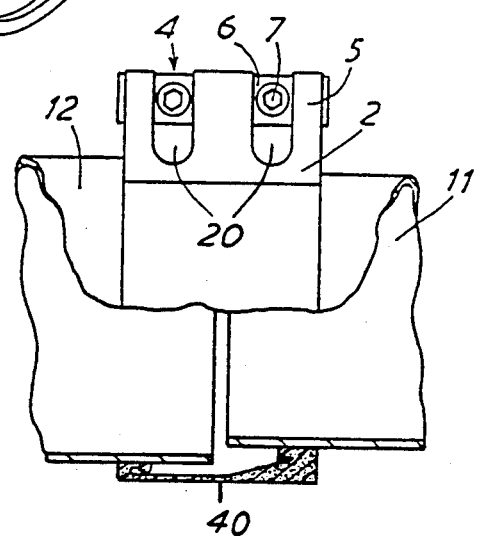
FIG. 2 shows the stepped coupling of FIG. 1 in a partly sectioned side elevation on an enlarged scale.

The stepped coupling 1 shown in the drawing has a flexible tubular casing 2 of rolled steel, the two free ends of which can be drawn together by means of a tensioning screw device 4, leaving a longitudinal gap 3. The casing 2 is folded back on itself at its free ends and welded to form butt loops 5 along the opposing edges of the longitudinal gap 3. The tensioning screw device 4 consists of retaining pins 6 inserted through the butt loops 5 and interconnected by two tensioning screws 7 which can be tightened in the direction of the circumference of the pipes. The tensioning screws pass freely through holes in one of the pins 6 and engage screw threaded holes in the other pin 6. Alternatively the tensioning screws may pass freely through holes in the second pin and be secured by nuts. Cut-out portions 20 are provided in the butt loops to allow access to the tensioning screws for tightening.

Figure 3:
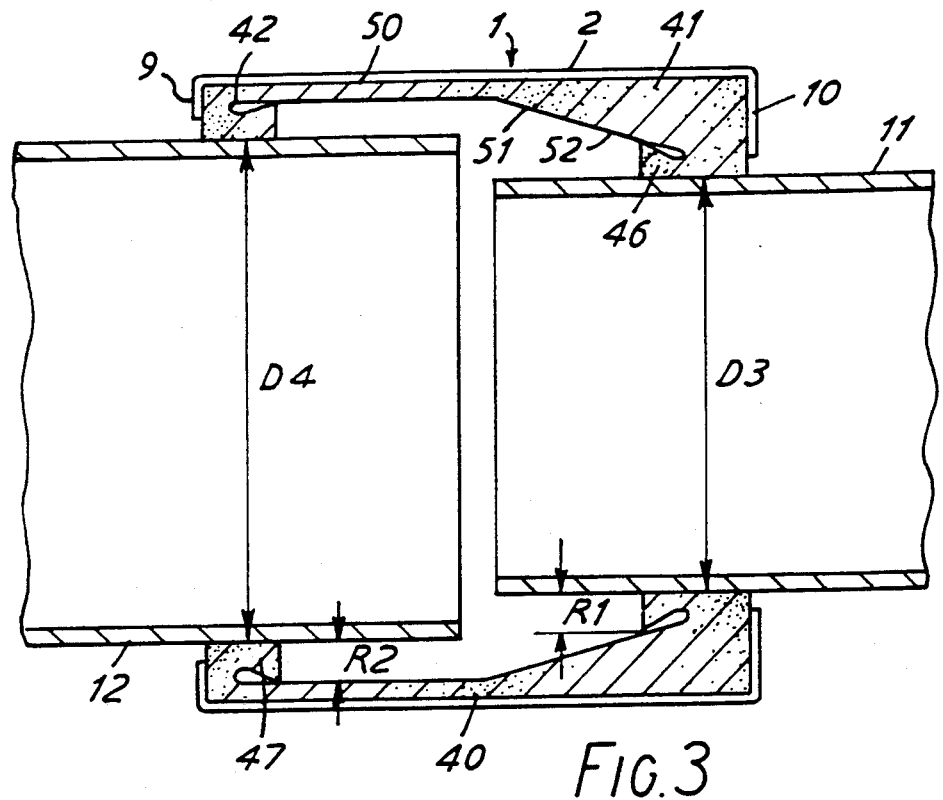
FIG. 3 shows a diagrammatic sectional view which does not include the screw connection region of the stepped coupling of FIG. 1 in accordance with the invention on a further enlarged scale.

As shown in FIG. 3, the lateral margins of the casing 2 are bent over inwardly in order to retain reliably an inserted synthetic rubber sealing sleeve 40.

The sealing sleeve 40 is made in the form of a one-piece circumferentially-continuous tube and comprises a tubular web portion 50 formed with integral inwardly-extending sealing lips 41 and 42 on both of its ends. As shown in FIG. 3 of the drawing, pipes 11 and 12 of different outside diameters may be connected together coaxially by means of the stepped coupling 45. To enable this to be done, the inside diameter D3 of the sealing lip 41 is substantially smaller than the internal diameter D4 of the sealing lip 42. The difference exceeds the manufacturing tolerance range for each individual pipe and may be as much as 25 mm, 30 mm or more depending upon the diameters of the pipes that are to be interconnected by the stepped coupling.

Figure 4:
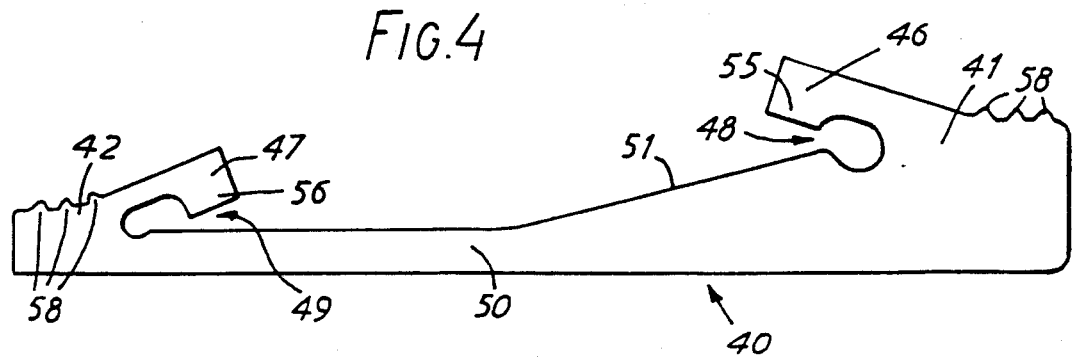
FIG. 4 shows the sealing sleeve of FIG. 3 on an enlarged scale.

Each of the sealing lips 41 and 42 has formed on its axially inner side a freely projecting annular extension 46 and 47 which have radically thicker portions 55 and 56 at their respective free ends. The annular extensions 46 and 47 are formed integrally with the sealing sleeve and, in the assembled condition shown in FIG. 3 fit with sufficient surface pressure against the outer surfaces of the pipes 11 and 12 to be connected, to form a seal. FIG. 4 shows the sealing sleeve in the relaxed condition in which the inner ends of the annular extensions tend to spring away from the web portion 50. This pressure is further increased by the pressurised medium which is conveyed in the pipes 11 and 12 which penetrates into grooves 48 and 49 in the inner sides of the lips. Thus the pressure of the medium itself is utilised to increase the surface pressure of the sealing lips against the sealing surfaces on the pipes. As the thickest parts of the extensions to the lips 41 and 42 are at the ends furthest from the free ends of the sleeve 40, the maximum sealing force is applied at the inner end of the lips. This tends to prevent the lips being pushed outwardly under the pressure of fluid in the pipe.

The inner surfaces 51 of the web portion 50 includes a tapered portion 52 so that the radial dimension R1 of the inner end of the lip 41 is substantially the same as the radial dimension R2 of the inner end of the lip 42. The surface areas of the inner sides of the lips 41 and 42 are thus of similar dimensions.

A series of circumferential ribs 58 are formed on the inside of the sleeve at its free ends. These ribs serve to improve the grip on the pipes and reduce the tendency of the pipes to be pushed out of the coupling by the fluid pressure in the pipes.

To assemble the coupling, the free ends of the pipes 11, 12, to be connected are introduced into the stepped coupling 1 which is then tightened by screwing up the tensioning screws 7, thereby reducing the width of the longitudinal gap 3 in the casing with a pressure-tight and reliable pipe connection is produced. Obviously care must be taken to ensure that the sealing lip 41 of smaller internal diameter is positioned on the smaller pipe and that the sealing lip 42 of larger internal diameter is positioned on the larger pipe. Then, during the assembly operation, the resiliently flexible sealing lips 41 and 42 will adapt themselves to the non-circular shape of ordinary pipe material so that an uninterrupted seating of the sealing surfaces of the lips 41 and 42 on the pipes is achieved. The difference of 25 mm or 30 mm in the outside diameter of the two pipes, which is assumed in the example, is compensated for by the stepped coupling 1 in a remarkably simple manner both structurally and in relation to assembly without there being any need to fear impairment of the pressure-tightness.

The arrangement described above enables smooth-ended pipes having diameters which differ from each other by more than the allowable tolerance range to be joined together in a simple manner and to enable a resiliently flexible pipe connection to be provided which, because of its construction, is simple to operate, is reliable as regards pressure-tightness and has advantages in connection with handling on the construction site.

A problem that may sometimes arise when the pipe coupling described in our earlier patent specification is used for pipes carrying fluid under high pressure is that the coupling tends to creep along the pipe. This is due to the axial resultant force arising from the fluid pressure on the inner end faces of the sealing lips. The surface area of the inner end of the larger lip is substantially greater than the surface area of the inner end of the smaller lip so that the pressure of the fluid in the space between the lips produces a resultant force on the coupling. It will be appreciated that if the resultant force is sufficient for the coupling to creep along the pipe, the coupling may move along the pipe until it falls off the end of the pipe 12. Whilst this will not normally happen when the pipes 11 and 12 are carrying fluid at low pressure, it could be a problem with pipes carrying fluid at high pressures, particularly when the difference in pipe diameter is large.

By incorporating an inclined "ramp angle" into the web of the sealing sleeve it may be possible to avoid the need for mechanical restraint of the coupling and use the sealing sleeve profile in conjunction with the pipe-line forces to establish as even a pressure load as is practical and regardless of differences in outside diameters of the pipe. It may also serve to ensure smooth flow through the bore of the fluid bearing conduit. We have found by experiments on prototypes with a ramp angle of less than 45%, that at pressures of 3 to 4 bar in the pipe, there is a reduction in the tendency for the coupling to creep compared with the previous design. In the preferred embodiment the ramp angle is approximately 15°.

A further advantage of the embodiment of FIGS. 1 to 4 is that because the radial dimension R1 of the lip 41 is reduced there is less tendency for the lip to buckle or collapse under the clamping forces of the sleeve and the pressure of fluid in the pipes.

Figure 5:
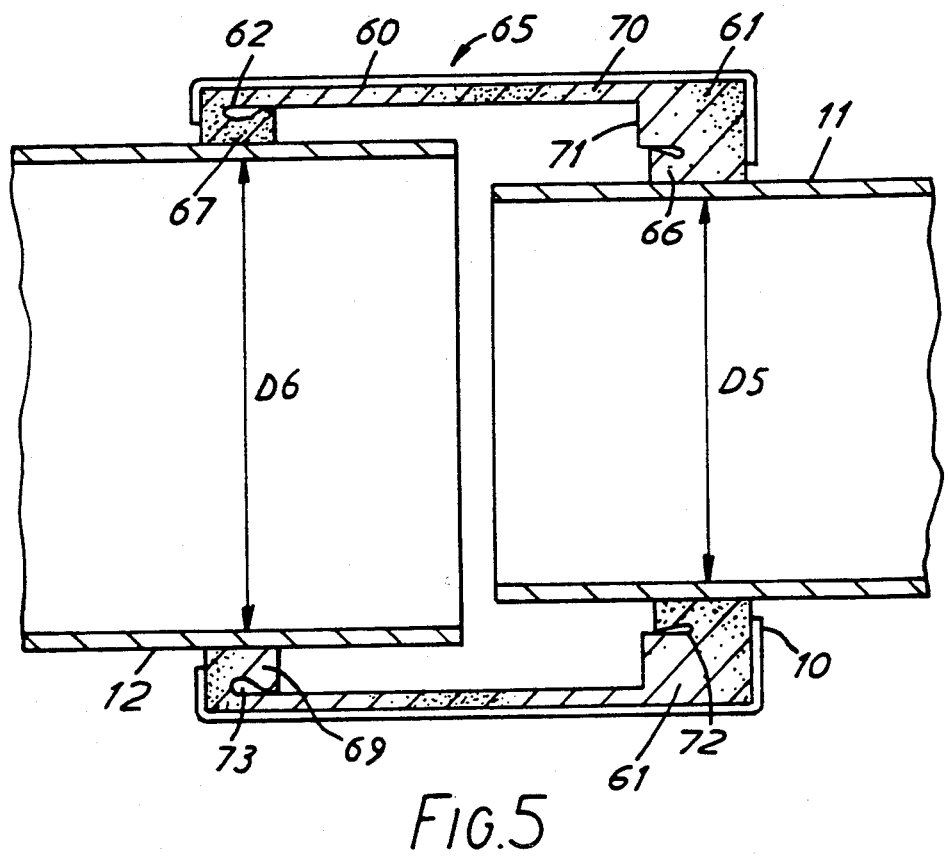
FIG. 5 shows a sectional view of another pipe coupling in accordance with the invention.

FIG. 5 shows a longitudinal section of another pipe coupling in accordance with the present invention. The pipe coupling of FIG. 5 differs from the pipe coupling of FIGS. 1 to 4 only in the form of the sealing sleeve. In other respects the coupling can be identical.

The coupling 65 shown in FIG. 5 comprises a casing 1 as described above and a sealing sleeve 60. The sealing sleeve 60 is made in the form of a one-piece circumferentially-continuous tube and comprises a tubular web portion 70 formed with integral inwardly-extending sealing lips 61 and 62 on both of its ends. As shown in FIG. 5 of the drawing, pipes 11 and 12 of different outside diameters may be connected together coaxially by means of the stepped coupling 65. To enable this to be done, the inside diameter D5 of the sealing lip 61 is substantially smaller than the internal diameter D6 of the sealing lip 62. The difference exceeds the manufacturing tolerance range for each individual pipe and may be as much as 25 mm, 30 mm or more depending upon the diameters of the pipes that are to be interconnected by the stepped coupling.

Each of the sealing lips 61 and 62 has formed on its axially inner side a freely projecting annular extension 66 and 67 which are thicker at their innermost ends 68 and 69. The extensions 68 and 69 are substantially the same in cross-section but the web portion 70 is thicker in the region 71 adjacent the extension 68 of the sealing lip of smaller internal diameter than it is adjacent the extension 69. The annular extensions 66 and 67 are formed integrally with the sealing sleeve and, in the assembled condition shown in FIG. 5, fit with sufficient surface pressure against the outer surfaces of the pipes 63 and 64 to be connected, to form a seal. The thickest portion 71 compensates for the difference in outside diameter of the pipes 63 and 64 and ensures that the extensions of the lips are pressed against the outer surfaces of the pipes with similar pressure. This pressure is further increased by the pressurised medium which is conveyed in the pipes 11 and 12 which penetrates into the grooves 72 and 73 in the inner sides of the lips which separate the extensions 68 and 69 from the web portion. Thus the pressure of the medium itself is utilised to increase the surface pressure of the sealing lips against the sealing surfaces on the pipes. As the thickest parts of the extensions to the lips 41 and 42 are at the ends furthest from the free ends of the sleeve 40, the maximum sealing force is applied at the inner end of the lips. This tends to prevent the lips being pushed outwardly under the pressure of fluid in the pipe.

As with the embodiment of FIGS. 1 to 4, in the construction according to FIG. 5 there will be less tendency for the sealing lip on the pipe of smaller diameter to buckle or collapse under the clamping force of the sleeve 2 and the pressure of the fluid in the pipes.

We claim:

1. A resiliently flexible pipe coupling for interconnecting two pipe ends in a pressure-tight manner, said coupling comprising:
a tubular sealing sleeve of resilient flexible material; and
an adjustable tubular metal casing for clamping said sealing sleeve around said pipe ends;
said sealing sleeve comprising:
a central tubular web portion, and
sealing lips integral with said web portion, said sealing lips being formed in adjoining relationship to said web portion to define opposite free ends of said sealing sleeve, said sealing lips extending radially inwardly from said web portion, said sealing lips being spaced apart longitudinally, and said sealing lips each having a radially inner pipe-engaging surface for engaging one of said pipe ends, said radially inner pipe-engaging surface of one of said lips having a substantially different internal diameter from said radially inner pipe-engaging surface of the other of said lips, whereby said coupling is adapted to connect two pipe ends of different external diameter, each of said sealing lips having an annular extension formed on its axially inner side, said annular extension being separated from said web portion of said sealing sleeve by a groove, said web portion in the region of said extension to said sealing lip of smaller internal diameter being radially thicker than said web portion in the region of said extension to the other said sealing lip, and in the assembled condition when said coupling is fitted to said pipe ends, at least one of said grooves communicates with a void defined between said web portion and said pipe ends in said coupling.

2. A resilient flexible pipe coupling according to claim 1, in which the inner surface and the radial thickness of said web portion includes a stepped transition between said thicker portion in said region of said sealing lip of smaller internal diameter and said thinner portion in said region of said sealing lip of larger internal diameter.

3. A resilient flexible pipe coupling according to claim 1, in which the internal diameter of the inner surface of said web portion increases and the radial thickness of said web portion decreases gradually from said region of said sealing lip of smaller internal diameter to said region of said sealing lip of greater internal diameter, and said sealing sleeve having, throughout the longitudinal extent thereof, a substantially uniform external diameter.

4. A resilient flexible pipe coupling according to claim 3, in which said internal surface of said web portion tapers uniformly.

5. A resilient flexible pipe coupling according to claim 4, in which said internal surface of said web portion includes a portion which slopes at an angle of less than 45° to the axis of said coupling.

6. A resilient flexible pipe coupling according to claim 5, in which said internal surface of said web portion slopes at an angle of approximately 15° to the axis of said coupling.

7. A resilient flexible pipe coupling according to claim 1, in which the radial thickness of each of said annular extensions increases towards its axial inner end.

8. A resilient flexible pipe coupling according to claim 1, in which the axially inner sides of said sealing lips have approximately equal surface areas.

9. A resilient flexible pipe coupling according to claim 1, in which said sleeve has a plurality of circumferentially extending ribs on the radially inner surface of said lips adjacent said free ends of the sleeve.

10. A resiliently flexible pipe coupling for interconnecting two pipe ends in a pressure-tight manner, said coupling comprising:
a tubular sealing sleeve of resilient flexible material; and an adjustable tubular metal casing for clamping said sealing sleeve around said pipe ends;
said sealing sleeve comprising:
a central tubular web portion, and
sealing lips integral with said web portion, said sealing lips being formed in adjoining relationship to said web portion to define opposite free ends of said sealing sleeve, said sealing lips extending radially inwardly from said web portion, said sealing lips being spaced apart longitudinally, and said sealing lips each having a radially inner pipe-engaging surface for engaging one of said pipe ends, said radially inner pipe-engaging surface of one of said lips having a substantially different internal diameter from said radially inner pipe-engaging surface of the other of said lips whereby said coupling is adapted to connect two pipe ends of different external diameter, said web portion in the region of said lip of smaller internal diameter being radially thicker than in the region of said lip of greater internal diameter, wherein the internal diameter of said web portion increases and the radial thickness of said web portion decreases gradually from the end of the sleeve adjacent said lip of smaller internal diameter towards said lip of greater internal diameter so that respective axially inwardly facing surfaces of said lips are of substantially the same surface area.

11. A resilient flexible pipe coupling according to claim 10, wherein said sealing sleeve has, throughout the longitudinal extent thereof, a substantially uniform external diameter.

12. A resilient flexible pipe coupling according to claim 11, wherein said sealing sleeve has a plurality of circumferentially extending ribs on the radially inner surfaces of said lips.

* * * * *